Patented Dec. 20, 1949

2,491,928

UNITED STATES PATENT OFFICE 2,491,928

METALLIFEROUS AZOIC DYES

Julius Miller and Eugene A. Markush, Newark, N. J., assignors to Pharma Chemical Corporation, New York, N. Y., a corporation of New York No Drawing. Application February 24, 1945, Serial No. 579,688

12 Claims. (Cl. 8—42)

Our invention relates to new chemical compounds, and particularly to metalliferous azoic dyes, and specifically to insoluble azoic dyes.

These dyes which generally yield rich, deep brown shades on cellulosic fibers, are produced by subjecting the bis-azo-nitroso compound having the formula:

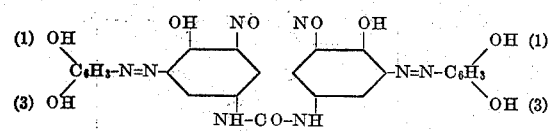

to react with, or more explicitly to couple with, two moles of a diazonium compound or one mole of a tetrazo compound in the presence of suitable metalizing agents such as water-soluble salts of chromium, copper, nickel, etc.

The diazonium and tetrazonium are applied preferably in the form of stabilized diazoniums, namely, diazoamino or diazo-imino compounds. The final product may also be obtained by applying the amine as nitrosamine.

It will be noted that the stabilizing compound does not enter into the finished dye, its sole use being to stabilize the diazo compound until it is required for combination with the coupling component.

The bis-azo-nitroso compound is a dinitroso derivative of 4-4'-dihydroxy-3-3'-diamino-diphenyl-urea described in our co-pending patent application, Serial Number 562,388, filed November 7, 1944.

The resulting brown dyes have the probable general formula, but we are not sure or certain, however, of the indicated linkages of the metal atom.

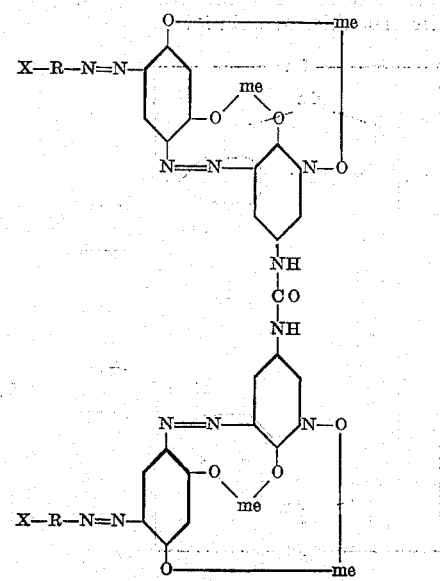

R = any diazotisable aromatic amine residue.
X = any substituent such as halogen, nitro, alkyl, aryl, alkoxy, aryloxy, but not any rendering solubility in water such as sulfonic, carboxylic or tertiary amines.
me = metal such as chromium, copper and nickel which are capable of forming metal azo complex compounds.

The bis-azo-nitroso compound is made according to the following synthesis:

Para-nitro-ortho-amino-phenol is acetylated to para-nitro-ortho-acetyl-amido-phenol. This compound is reduced to para-amido-ortho-acetyl-amido-phenyl and subsequently treated with carbonyl-chloride. The acetyl groups are hydrolyzed off, and the resultant diamido compound, upon treatment with sodium nitrite in the presence of hydrochloric acid, yields 3-3'-tetrazoniumchloride-4-4'-dihydroxy-5-5'-dinitroso-diphenyl-urea. When coupled with resorcinol, the 5-5'-dinitroso-4-4'-dihydroxy-diphenyl-3-3'-bis-azo-resorcinol is obtained.

A more specific adaptation of the step in this process for the synthesis of the dinitrosodiazo compound is as follows: 30½ parts of 4-4'-dihydroxy-3-3'-diamino-diphenyl-urea are slurried in 1000 parts of cold water, and 100 parts of hydrochloric acid, and cooled with ice to 0°-5° C. and treated with 35 parts of sodium nitrite in solution. The solution is stirred for ½ hour and filtered. The compound thus formed has the formula:

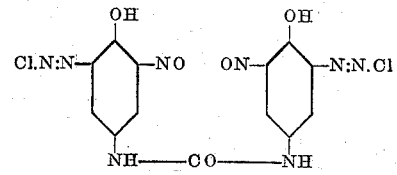

This compound is unstable, but can be combined with coupling compounds, such as amines and phenols for the production of valuable dyes. After the coupling with the resorcinol, there is obtained the compound having the structure:

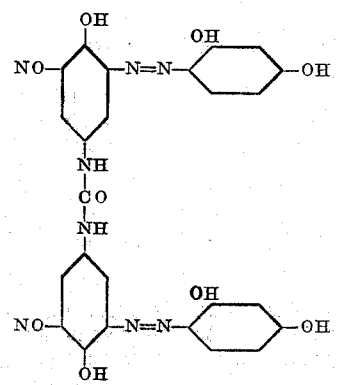

This dye, when dry, is a black lustrous crystalline powder readily soluble in caustic alkaline solutions. This dye combines with two molecules of diazonium to form polyazo dyes which are easily converted into metalized dyes. These metalliferous colors have excellent fastness, and the whole procedure for their formation is readily achieved by the well-known printing methods used in the art. These methods we now describe and will further disclose the scope of our invention.

*Example I*

25.3 parts of the diazo-imino resulting from the condensation of diazotised o-amino-diphenyl ether and proline are mixed with 12.6 parts of 5-5'-dinitroso -4-4'- dihydroxy - diphenyl-urea-3-3'-bis azo resorcinol, the latter hereinafter called "urea-dye" for the sake of simplicity.

This is covered with 25 parts of Cellosolve (ethylene - glycol - monoethyl-ether), 332.0 parts of water and 25.6 parts sodium hydroxide solution 32° Bé. Upon stirring, a clear brown solution results. This is then thickened with 579.5 parts starch-tragacanth paste commonly used in textile printing. The mass is stirred until a homogenous paste is obtained, then 40 parts of a 26.4% neutral sodium chromate solution are added and again stirred until uniform consistency is attained.

Cotton cloth is printed with this paste, and aged for 3 to 5 minutes in a live steam ager in the presence of acetic or formic acid or a mixture of both. Upon subsequent rinsing, hot soaping, rinsing and drying, there results a deep rich seal brown shade, the probable formula of which is:

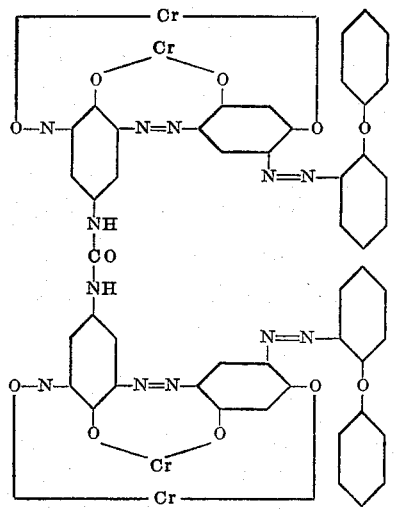

*Example II*

1000 parts of a printing paste are prepared as follows:

35.34 parts of the bis-diazoimino resulting from the condensation of diazotised 4-chlor-2-amino-anisol and ethylene-diamino diacetic acid.

12.6 parts urea dye
25 parts glycol-monoethyl-ether
25.6 parts sodium hydroxide solution 32° Bé.
320 parts water This mixture is stirred to solution and thickened with sufficient starch-tragacanth paste to total 960 parts. 40 parts of neutral sodium chromate solution 26.4% by weight are incorporated into the paste.

Cotton cloth printed with this color paste yields, after the treatment described in Example I, a deep brown shade somewhat yellower than that described in the previous example.

The probable formula is:

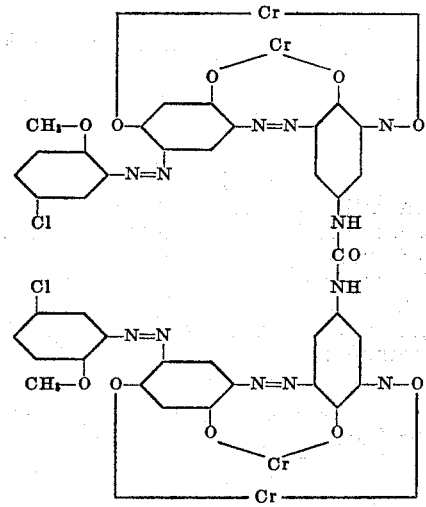

*Example III*

Cloth is printed with a printing paste prepared as follows:

28 parts of the diazoamino resulting from the condensation of diazotised para-phenetidine and alphacarboxy-piperidine.

12.6 parts urea dye
25 parts Cellosolve (ethylene-glycol-monoethyl-ether)
25.6 parts sodium hydroxide solution 32° Bé.
327 parts of water
542 parts starch-tragacanth paste To this is added 40 parts of a mixture prepared of:

25 parts $CuSO_4, 5H_2O$
15 parts tartaric acid
10 parts NaOH
50 parts water

After printing and subsequent treatment as above, there results a reddish brown.

The probable formula is:

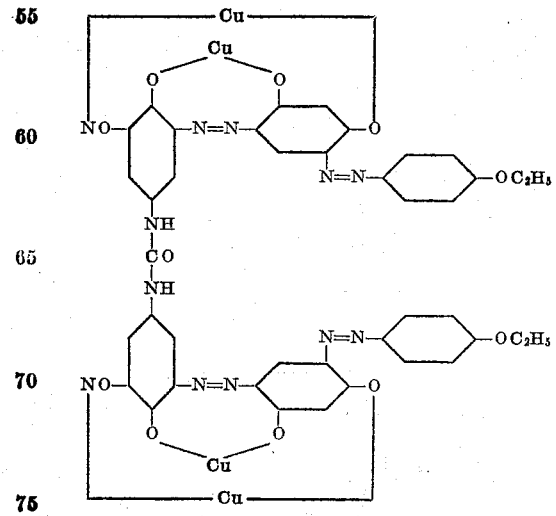

Example IV

Cotton cloth is printed with 1000 parts of paste prepared from:

14 parts of the bis-diazoimino of tetrazotised dianisidine condensed with proline.
12.6 parts urea dye
25 parts methyl Cellosolve
25.6 parts sodium hydroxide solution 32° Bé.
350 parts water
Thickened with a quantity of starch tragacanth paste to total 960 parts
40 parts of sodium chromate solution 26.4%

The resultant shade after the described treatment is a dark brown with a purple cast.

The probable formula is:

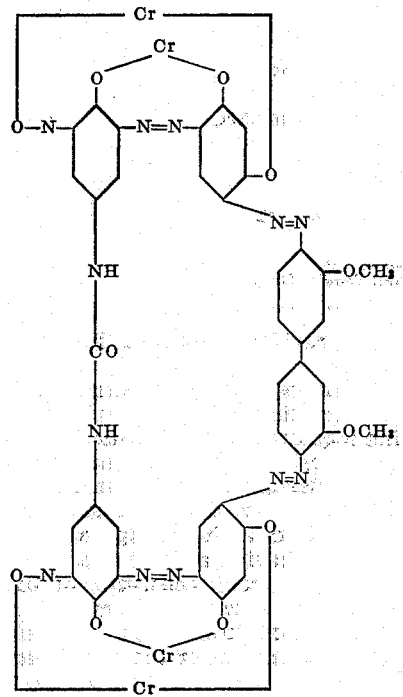

Example V 42 parts of the diazoimino resulting from diazotised cresidine and proline are mixed with:

12.6 parts urea dye
25 parts Cellosolve (ethylene-glycol-monoethyl ether)
25.6 parts sodium hydroxide solution
315 parts of water When all is dissolved, starch tragacanth paste is added so that the total weighs 960 parts.

40 parts of a solution of sodium nickel tartrate prepared from nickel sulfate, tartaric acid, and sodium hydroxide.

This paste is then printed on cotton cloth and treated as described. There results a deep brown print.

The probable formula is:

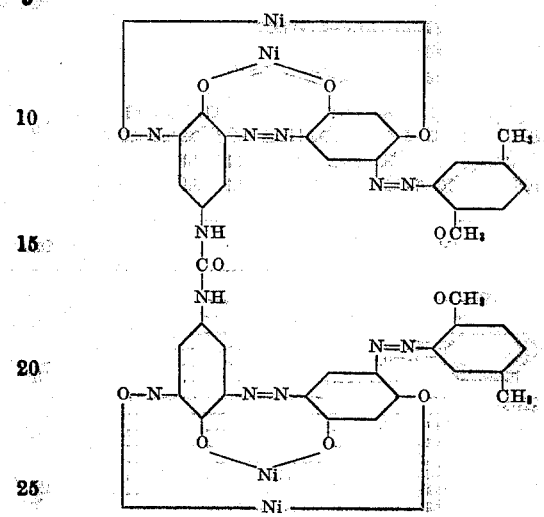

Example VI

Sufficient sodium nitrosamine of 5-nitro-2-toluidine containing the equivalent of 6.1 lbs. of 100% 5-nitro-2-toluidine is pasted with 12.6 lbs. of "urea dye," 43.7 lbs. of sodium hydroxide 40° Bé., 50 lbs. of ethylene glycol monoethyl ether and sufficient water to make a total of 500 lbs. Upon stirring, a solution results which is thickened with alkaline starch tragacanth paste and 40 lbs. of sodium copper tartrate prepared as previously described. The total weight of the printing paste is 1000 lbs.

The paste is printed on cotton cloth and after aging in the presence of live steam and acetic-formic acid vapors for five minutes, subsequent hot soaping, rinsing, and drying, there results a chocolate brown print.

The probable formula is:

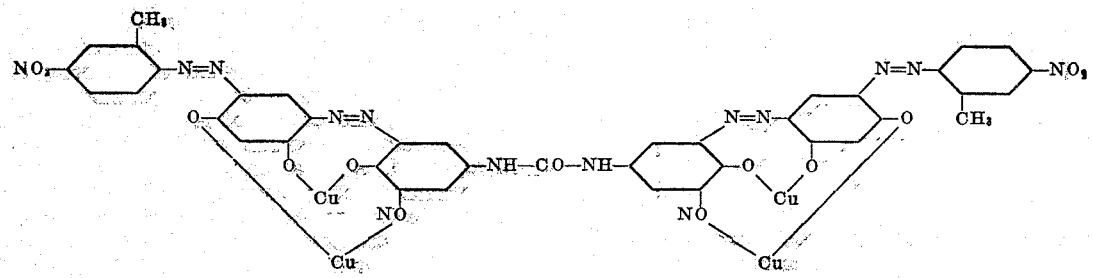

The stabilizers do not constitute any claim of the invention and we do not limit ourselves to those mentioned in the examples. We found that stabilizers listed herewith or selected from the group indicated by any individual stabilizer recorded herewith can be successfully applied.

4-sulfo-2-amino benzoic acid
4-sulfo-2-methylamino-benzoic acid
Butylaminoacetic acid
Trimethylene-bis-(imino-acetic acid)
Penta-methylene-bis-(imino-propionic acid)
Methylene-bis-(imino-acetic acid)
Ethylol-bi-guanide Dicyandiamide
Ethanol-amino-ethane-sulfonamide-acetic acid
P-phenylene-diamine-disulfonic acid
Guanyl-taurine
Diethanol-amine
3-tetra-methylensulfone-glycine
Methyl glucamine
Piperidine-alpha-carboxylic acid The following table further illustrates the dyes resulting from the combination of diazoniums of amines coupled with the urea compound in the presence of the salts of the designated metals.

| Diazo Compounds of Amines | Metal | Shade |
|---|---|---|
| 2-amino-diphenyl | Cr | Deep Brown. |
| Do | Cu | Brown. |
| Benzidine | Cr | Do. |
| 1-methyl-2-amino-benzene | Cr | Do. |
| 1-amino-2-4-dimethyl-benzene | Cr | Bright Chocolate Brown. |
| 1-amino-3-chlor-benzene | Cr | Brown Purple Cast. |
| Aniline | Cr | Brown. |
| 2-amino-naphthalene | Cr | Very deep Brown Purple Cast. |
| 1-amino-4-methoxy-benzene | Cr | Full deep Brown. |
| 1-amino-4-methyl-benzene | Cr | Brown. |
| 1-amino-napthalene | Cr | Seal Brown. |
| 1-amino-2:4-diethoxy-benzene | Cu | Deep Reddish Brown. |
| 1-amino-2-methoxy-benzene | Cr | Seal Brown. |
| 4-4'-diamino-3-3'-dichlor-diphenyl | Cr | Deep Brown Purple Cast. |
| 1-amino-3-methyl-benzene | Cr | Seal Brown. |
| 1-methyl-3-benzoyl-amino-4-chlor-6-amino-benzene | Cr | Do. |
| 4-4'-diamino-diphenyl-methane | Cr | Chocolate Brown. |
| 1-methyl-2-amino-5-nitro-benzene | Cr | Seal Brown Reddish Cast. |

We do not limit ourselves to the particular chemicals, quantities, or steps of procedure specifically mentioned as they are given solely for the purpose of clearly describing our invention.

What we claim is:

1. The water-insoluble azo compounds of the general formula:

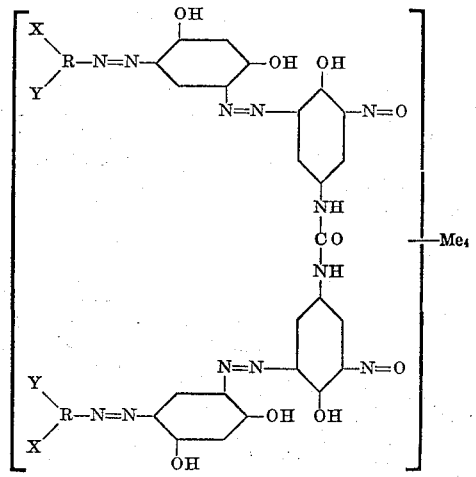

in which R is a diazotizable aromatic amine residue, devoid of sulfonic, carboxylic, and tertiary amine groups; X is a substituent selected from the group consisting of halogen, nitro, alkyl, aryl, alkoxy, and aryloxy, and Y is selected from the group consisting of hydrogen and the members of group X; Me is a member of the group consisting of chromium, copper, and nickel; the said compounds being formed and deposited upon the fibers of cellulosic textile material, and when so produced, yielding deep brown shades of marked fastness to light, washing, and chlorine.

2. A compound of claim 1 in which me is chromium.

3. A compound of claim 1 in which me is copper.

4. A compound of claim 1 in which me is nickel.

5. As a composition of matter a mixture, adapted for printing cellulosic textile materials, comprising a quantity of 5-5'-di-nitroso-4-4' dihydroxy-diphenyl-urea-3-3'-bis - azo - resorcinol and the molecular quantity of a stabilized diazotized aromatic amine, devoid of sulfonic, carboxylic and tertiary amine groups, sufficient for bis coupling and having at least one substituent selected from the group consisting of halogen, nitro, alkyl, aryl, alkoxy and aryloxy, and a water-soluble salt of a member of the group consisting of chromium, copper and nickel, in amount sufficient to provide 4 atoms of the metal per molecule.

6. As a composition of matter a mixture, adapted for printing cellulosic textile materials, comprising a quantity of 5-5'-di-nitroso-4-4' dihydroxy-diphenyl-urea-3-3'-bis - azo - resorcinol and the molecular quantity of a stabilized diazotized aromatic amine, devoid of sulfonic, carboxylic and tertiary amine groups, sufficient for bis coupling and having at least one substituent selected from the group consisting of halogen, nitro, alkyl, aryl, alkoxy and aryloxy, and a water-soluble salt of chromium, in amount sufficient to provide 4 atoms of the metal per molecule.

7. As a composition of matter a mixture adapted for printing cellulosic textile materials, comprising a quantity of 5-5'-di-nitroso-4-4' dihydroxy-diphenyl-urea-3-3'-bis - azo - resorcinol and the molecular quantity of a stabilized diazotized aromatic amine, devoid of sulfonic, carboxylic and tertiary amine groups, sufficient for bis coupling and having at least one substituent selected from the group consisting of halogen, nitro, alkyl, aryl, alkoxy, and aryloxy, and a water-soluble salt of copper, in amount sufficient to provide 4 atoms of the metal per molecule.

8. As a composition of matter a mixture, adapted for printing cellulosic textile materials, comprising a quantity of 5-5'-di-nitroso-4-4' dihydroxy-diphenyl-urea-3-3'-bis - azo - resorcinol and the molecular quantity of a stabilized diazotized aromatic amine, devoid of sulfonic, carboxylic and tertiary amine groups, sufficient for bis coupling and having at least one substituent selected from the group consisting of halogen, nitro, alkyl, aryl, alkoxy and aryloxy, and a water-soluble salt of nickel, in amount sufficient to provide 4 atoms of the metal per molecule.

9. Cellulosic textile material having developed thereon and adsorbed thereto an insoluble dyestuff by a composition of matter of claim 5.

10. Cellulosic textile material having developed thereon and adsorbed thereto an insoluble dyestuff by a composition of matter of claim 6.

11. Cellulosic textile material having developed thereon and adsorbed thereto an insoluble dyestuff by a composition of matter of claim 7.

12. Cellulosic textile material having developed thereon and adsorbed thereto an insoluble dyestuff by a composition of matter of claim 8.

JULIUS MILLER.
EUGENE A. MARKUSH.

REFERENCES CITED

The following references are of record in the file of this patent:

UNITED STATES PATENTS

| Number | Name | Date |
|---|---|---|
| 946,050 | Kahn | Jan. 11, 1910 |
| 1,282,355 | Anderwert et al. | Oct. 22, 1918 |
| 1,292,385 | Anderwert et al. | Jan. 21, 1919 |
| 1,882,561 | Haller et al. | Oct. 11, 1932 |
| 1,933,585 | Brightman et al. | Nov. 7, 1933 |
| 2,228,415 | Sparks et al. | Jan. 14, 1941 |
| 2,428,130 | Straub | Sept. 30, 1947 |

FOREIGN PATENTS

| Number | Country | Date |
|---|---|---|
| 20,216 | Great Britain | 1910 |
| 102,881 | Great Britain | Jan. 4, 1917 |
| 796,273 | France | Jan. 22, 1936 |